United States Patent
Stolze

(10) Patent No.: US 8,534,340 B2
(45) Date of Patent: Sep. 17, 2013

(54) DEVICE FOR CONNECTING PRODUCTS MUTUALLY AND AN ULTRASONIC WELDING DEVICE

(75) Inventor: Martin Stolze, De Lier (NL)

(73) Assignee: Martin Stolze B.V., De Lier (NL)

( * ) Notice: Subject to any disclaimer, the term of this patent is extended or adjusted under 35 U.S.C. 154(b) by 9 days.

(21) Appl. No.: 13/420,725

(22) Filed: Mar. 15, 2012

(65) Prior Publication Data
US 2012/0234494 A1   Sep. 20, 2012

(30) Foreign Application Priority Data

Mar. 16, 2011   (NL) ...................................... 2006409

(51) Int. Cl.
*B32B 37/00*   (2006.01)

(52) U.S. Cl.
USPC ..................................... 156/580.2; 156/580.1

(58) Field of Classification Search
USPC ............... 156/73.1, 580.1, 580.2; 425/174.2; 228/110.1, 1.1; 310/323.01, 323.18
See application file for complete search history.

(56) References Cited

U.S. PATENT DOCUMENTS

| | | | |
|---|---|---|---|
| 4,145,236 A * | 3/1979 | Neumayer et al. | 156/73.1 |
| 4,681,645 A * | 7/1987 | Fukushima et al. | 156/73.1 |
| 4,767,492 A * | 8/1988 | Fukusima et al. | 156/580.2 |
| 5,601,669 A * | 2/1997 | Moody et al. | 156/73.1 |
| 5,759,319 A * | 6/1998 | Moody et al. | 156/73.1 |
| 5,941,019 A | 8/1999 | Guarriello, Sr. et al. | |
| 2007/0079536 A1 | 4/2007 | Hall | |

FOREIGN PATENT DOCUMENTS

| | | |
|---|---|---|
| DE | 102 11 996 A1 | 11/2003 |
| GB | 2 418 410 A | 3/2006 |
| JP | 11-102159 A | 4/1999 |
| NL | 2 002 381 C | 7/2010 |

OTHER PUBLICATIONS

Dutch Search Report, dated Dec. 19, 2011, from corresponding Dutch application.

* cited by examiner

*Primary Examiner* — James Sells
(74) *Attorney, Agent, or Firm* — Young & Thompson

(57) ABSTRACT

Device for attaching a first product to a second product includes an ultrasonic welding device intended and adapted to realize a durable welded connection between a wall of the first product and the second product. The welding device includes an ultrasonic welding torch and an anvil which are each displaceable between a rest position, clear of the first product and the second product, and an active position opposite each other in which a wall part of the first product and a strip-like part of the second product lie therebetween. First supply elements are provided for supplying the first product to the welding device. Second supply elements are available and intended for moving the second product to the wall of the first product. The welding device includes a displaceable support arm from which the anvil extends together with at least one of the second supply elements and the ultrasonic welding torch.

17 Claims, 2 Drawing Sheets

Figure 1A:
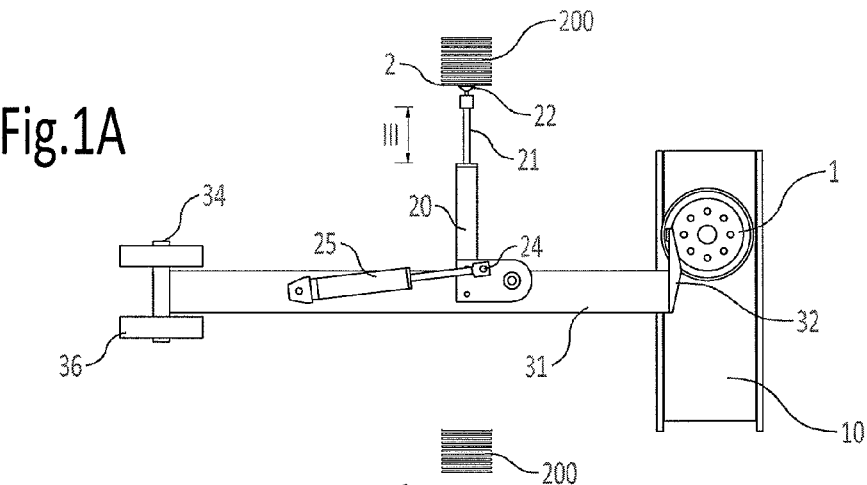
Figure 1B:
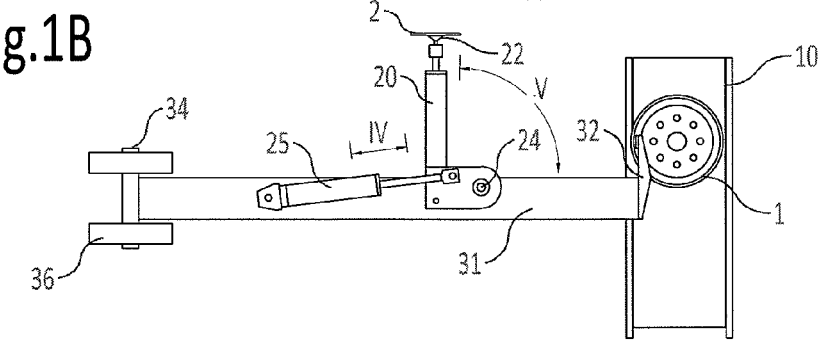
Figure 1C:
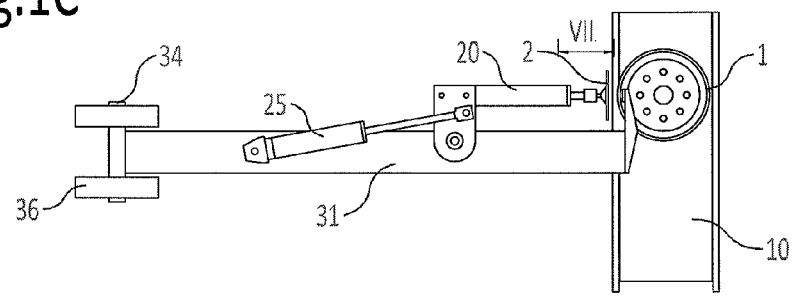
Figure 1D:
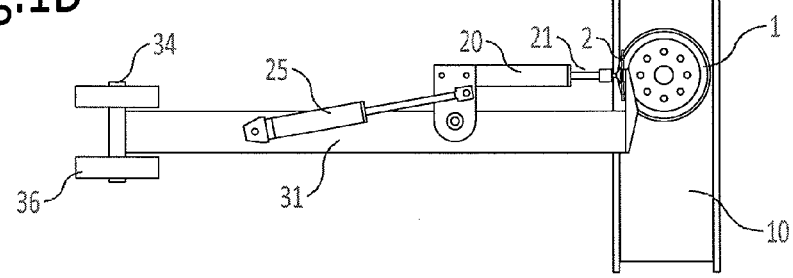

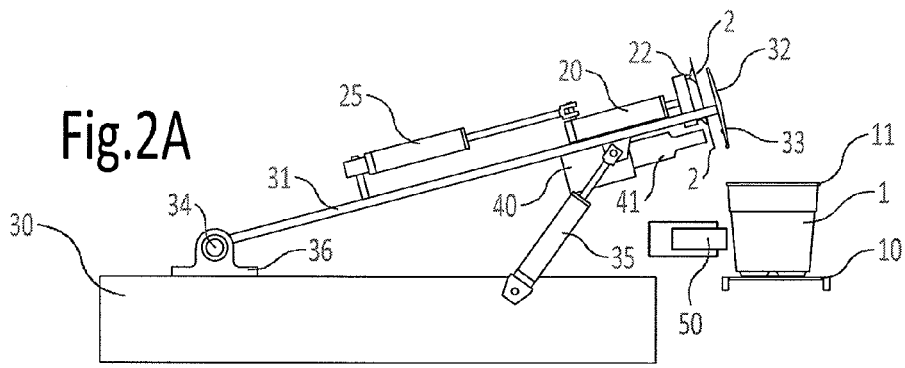
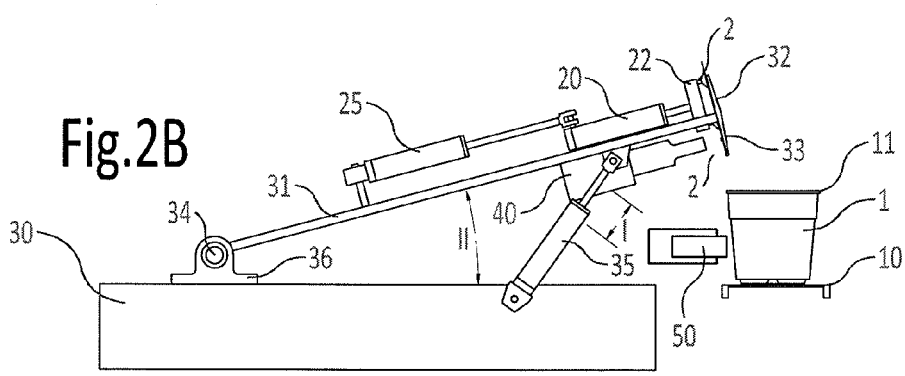
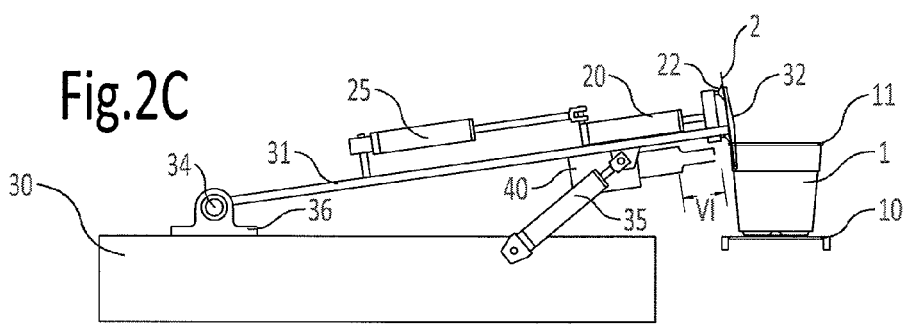
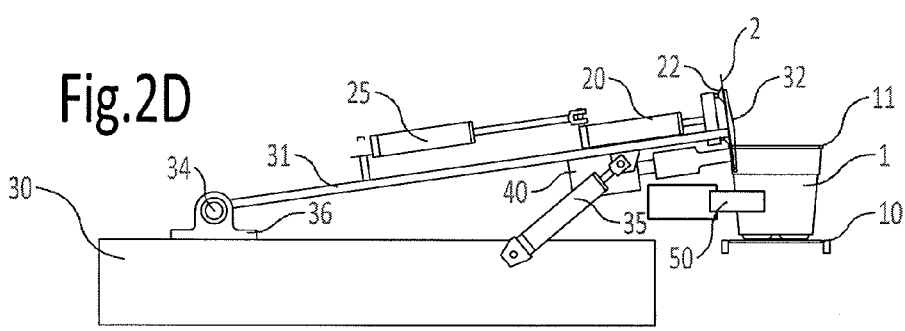

DEVICE FOR CONNECTING PRODUCTS MUTUALLY AND AN ULTRASONIC WELDING DEVICE

The present invention relates to a device for attaching a first product to a second product, comprising an ultrasonic welding device which is intended and adapted to realize a durable welded connection between a wall of the first product and the second product, which welding device comprises an ultrasonic welding torch and an anvil which are each displaceable between a rest position, clear of the first product and the second product, and an active position opposite each other in which a wall part of the first product and a strip-like part of the second product lie therebetween, first supply means suitable and intended for receiving the first product thereon and supplying it in a transport direction to the welding device, and second supply means suitable and intended for receiving the second product and moving at least the strip-like part thereof close to the wall of the first product, wherein the welding device comprises a displaceable support arm and the anvil extends from the displaceable support arm with which the anvil is displaceable between the rest position and the active position.

Such a device is applied particularly in the cultivation of ornamental pot plants, wherein the first product is a plastic container having therein soil or another growth substrate and a pot plant, and the second product comprises a strip-like plastic information carrier for attaching to the container. The information carrier for instance provides information about the nature, care and origin of the pot plant received in the container. Large-scale glass horticulture is characterized by very large numbers of products which often have to be made ready for dispatch in a short time and usually on demand, and have to be provided for this eventuality with a suitable information carrier. This is not infrequently still done by hand, wherein information carriers are inserted close to the plant in the substrate. A drawback hereof however is that this is relatively time-consuming, requires manpower and moreover entails the risk of the information carrier and the plant inadvertently being separated, for instance during transport or during further processing. For this and other reasons a fully mechanized device is therefore sought which can take over this work completely, has a high processing speed and can provide a durable attachment between container and information carrier.

Such a device as described in the preamble is known from Netherlands patent no. 2002381. The first product comprises here a container filled with plant material and the second product is a strip-like handle connected thereto. The known device comprises a first transport means in the form of a driven endless conveyor belt with which containers provided with a substrate and a pot plant rooting therein are successively supplied and pass through a welding station with a welding device. Provided at the location of the welding device are so-called clamping dishes which lift a container a short distance from the normal transport path and fix it for a short time in order to provide it with a handle. The welding device comprises for this purpose on one side an ultrasonic welding torch, referred to as a sonotrode, which approaches a wall of the container in a linear path transversely of the transport path, while on an opposite side an anvil is inserted behind the relevant wall and into the substrate. Robot arms are provided to position a strip-like outer end of a handle fully automatically here between the sonotrode and the wall such that a durable welded connection is realized therebetween following activation of the sonotrode.

The known device has the drawback however that it is relatively voluminous. Not only does this increase the cost price, it also requires space in a production environment which is not always available and which is in any case preferably saved. The operation of the known device is moreover relatively complex in that the sonotrode, the anvil and the robot arms here have to be driven and move wholly independently of each other for the purpose of the welded connection to be arranged, but nevertheless have to be positioned and aligned relative to each other at the correct moment with relatively high precision in order to realize a reliable weld. This requires an accurate setting and adjustment, which will vary during use and will have to be periodically readjusted.

The present invention has for its object, among others, to provide a device for mutually connecting products which obviates one or more of these drawbacks.

In order to achieve the stated object a device of the type stated in the preamble has the feature according to the invention that at least one of the welding torch and the second supply means extends together with the anvil from the displaceable support arm and is displaceable at least particularly with the support arm between at least the rest position and the active position. For the purpose of positioning the anvil on the one hand and at least one of the welding torch and the second supply means on the other the device thus comprises a shared operating arm which positions them together from the rest position to the active position, and vice versa. This ensures a mutual timing and makes their relative alignment at least largely stationary since it is imposed by the shared support arm. The relative alignment and positioning of these components is thereby more robust and needs no or hardly any readjustment during operation. The shared support arm moreover requires less space than separate arms, whereby the device can be embodied considerably more compactly than the known device.

In a preferred embodiment the device according to the invention has the feature that the support arm is pivotable about a rotation shaft directed at least substantially parallel to the transport direction, and that the support arm is coupled to an actuator, particularly a linear actuator, which is able and adapted to impose on the support arm a controlled rotation about the pivot shaft between the rest position and the active position. The support arm pivots here between the rest position and the active position about a precisely defined pivot point on the rotation shaft, whereby an axial fluctuation is limited to a minimum.

In a first particular preferred embodiment the device according to the invention is characterized in that at least the second supply means extend from the displaceable support arm and are thereby displaceable between a pick-up position for receiving the second product and the active position for presenting therein the second product with the strip-like part between the welding torch and the anvil. Not only does the support arm carry the anvil into position here but it also displaces the second supply means between a pick-up position, in which a second product is thereby individualized and taken up from a supply, and the active position in which a strip-like part of the second product is presented together with a wall part of the first product between the welding torch and the anvil. In a further particular embodiment the device is characterized here in that the pick-up position coincides with the rest position of the anvil.

The second supply means can be embodied per se in various ways. A further preferred embodiment of the device has in this respect however the feature according to the invention that the second supply means comprise a manipulator with a pick-up member which is able and adapted to enter into a temporary attachment with the second product and that the pick-up member is displaceable from the manipulator between the pick-up position, in which the second product is picked up, and at least one further position, particularly an adjustable further position, in which the second product is presented between the welding torch and the anvil. Not only is the manipulator with the support arm thus guided from the pick-up position, optionally coinciding with the rest position, to the active position, but the pick-up member can moreover make an additional stroke or other displacement. This provides the option of positioning the second product as desired and accurately between the welding torch and the anvil and relative to the wall part. Particularly the strip-like part of the second product to be attached can thus be inserted as required in front of or behind the wall of the first product, for instance in order to take into account a possible beaded edge of a pot plant container.

In a further embodiment the device according to the invention has the feature that the manipulator is connected to the support arm for pivoting about a rotation shaft directed transversely of a rotation shaft of the support arm. Pick-up and release of a second product by the manipulator from the shared support arm can thus be performed from different orientations relative to the support arm. This provides in practice a useful extra degree of freedom.

In a second particular preferred embodiment the device according to the invention is characterized in that at least the welding torch is connected to the support arm and extends from the support arm at an outer end thereof. At least a relative alignment and positioning of the anvil and the welding torch are thus ensured in that they are at least largely imposed by the shared support arm. A further particular embodiment of the device has the feature here that at least one of the anvil and the welding torch is displaceable to the other of the anvil and the welding torch in order to enclose the wall of the first product and the strip-like part of the second product therebetween, and more particularly that the welding torch is linearly displaceable in a path directed substantially parallel to the support arm toward the anvil. The welding torch and the anvil can thus be positioned freely via the wall and the strip-like part of the second product before enclosing and possibly clamping the whole together to some extent here so as to enhance a reliable ultrasonic weld.

In a further particular embodiment the device according to the invention is characterized in that a magazine is provided which is intended and adapted to receive a supply of second products therein and to successively present a subsequent second product to the second supply means for pick-up purposes. Successive second products can thus be individualized fully automatically from the magazine and be guided by the second supply means to the first product. An operator need only replenish the supply from time to time, while the device can remain fully operational. In a further particular embodiment the device according to the invention is characterized here in that the magazine is connected to the support arm. The magazine thus also has on the support arm a fixed position which remains stationary relative to the other components present on the arm. Particularly if the second supply means also extend from the support arm, this not only has the advantage that a relative alignment is at least largely imposed by the support arm and remains robust, but also that a second product can be taken out of a magazine and positioned as soon as and while the support arm performs a movement from the (preceding) active position to the rest position, and back again to the subsequent active position. No additional operating step is thus required for the supply of second products.

With a view to a treatment of a container filled with a substrate and pot plant, a further particular embodiment of the device according to the invention has the feature that the anvil is mounted on an outer end of the support arm and has on a side remote from the welding torch a substantially convex surface at least in a direction of displacement thereof. The convex surface has the advantage here that a leaf and stem system of the plant present in the container will be moved gradually away therefrom instead of being damaged by the anvil when the anvil protrudes into the pot. The convex surface extends for this purpose particularly in the direction of displacement of the anvil.

In a further embodiment the device according to the invention has the feature that the first supply means comprise a driven endless conveyor belt, while a further particular embodiment of the device has the feature here that the conveyor belt is provided at the position of the welding device with fixation means for receiving a first product supplied thereby and temporarily fixing it relative to the welding device. The endless belt supplies the first products here in a constant flow in order to be provided with a second product at the location of the welding device. In order to give the welding device a short time to realize a reliable mutual connection, fixation means can be provided here which temporarily halt and fix the first product relative to the welding torch. A further particular embodiment of the device according to the invention here has the feature in this respect that the fixation means comprise an intermittently protruding member which is displaceable in a linear path directed transversely of the transport direction between a rest position located outside a transport path of a first product and a fixation position located in the transport path.

The invention also relates to an ultrasonic welding device of the type as applied in the above described device, comprising a displaceable support arm, from which an anvil and at least one of an ultrasonic welding torch and supply means for a second product extend so as to be displaceable together with the anvil between at least an active position and a further position thereof, and will now be further elucidated on the basis of an exemplary embodiment and an accompanying drawing. In the drawing:

FIGS. 1A-1D show top views of an exemplary embodiment of a device according to the invention at successive stages of operation; and FIGS. 2A-2D show cross-sections of the device of FIGS. 1A-1D at successive stages of operation.

It is otherwise noted here that the figures are purely schematic and not drawn to scale. Some dimensions in particular may be exaggerated to greater or lesser extent for the sake of clarity. Corresponding parts are designated as far as possible in the figures with the same reference numeral.

The figures show schematic views of a production environment for processing pot plants received in plastic containers 1, wherein the containers are provided in fully automated manner with a plastic information carrier 2 with information concerning the nature, care and origin of the plant in question. Provided for this purpose are first supply means in the form of an endless belt 10, on which containers 1 are successively supplied. For the sake of clarity neither the plant nor a substrate filling of the container are further shown. Belt 10 is driven by its own electric motor or is interconnected to a further belt provided with such a drive.

Conveyor belt 10 carries the container to a welding station with an ultrasonic welding device 30. The welding device comprises a displaceable support arm 31, at an outer end of which is arranged an anvil 32 which extends therefrom at an outer end and protrudes downward with a relatively narrow part 33 into container 1. Support arm 31 is mounted for pivoting about a pivot shaft 34 and is coupled to a linear actuator 35, in this case a pneumatic cylinder, which is able and can be controlled to displace support arm 31 between the rest position shown in FIG. 2A and the active position shown in FIG. 2D. Support arm 21 is bearing-mounted here in a bearing block 36. The respective strokes I, II made here by the actuator and support arm are indicated by way of further illustration in FIG. 2B.

Also extending from support arm 31 are second supply means in the form of a manipulator 20 with a drive rod 21 extending linearly therefrom which can make the stroke III further indicated for the sake of clarity in FIG. 1A. Situated at an outer end of drive rod 21 is a pick-up member 22 in the form of a suction cup, in which an underpressure can be applied or released in controlled manner from manipulator 20 in order to respectively temporarily attach thereto or release therefrom an information carrier 2. Manipulator 20 is in turn connected to support arm 31 for pivoting about a pivot shaft 24 and coupled to a linear actuator 25 in the form of a pneumatic cylinder which can make the linear stroke IV shown for the purpose of further elucidation in FIG. 1B in order to impose on manipulator 20 the radial stroke V likewise shown in the figure.

An ultrasonic welding torch 40 is mounted on an underside of support arm 31, see FIGS. 2A-2D. Welding torch 40 comprises a linearly extendable sonotrode 41 which can make the stroke VI shown for the purpose of further elucidation in FIG. 2C and directed toward anvil 32, 33 in order to thereby clamp a wall part of container 1 together with an information carrier 2. Sonotrode 41 is able when activated to cause an ultrasonic vibration between wall part 1 and information carrier 2. The two products are manufactured from a thermoplastic plastic, preferably of the same or similar type and will soften and fuse together under the influence of the frictional heat which develops here and thus enter into a durable mutual connection.

The operation of the device becomes apparent from the successive stages 1A-D and 2A-D as shown in the figures. In the rest position shown in FIG. 1A manipulator 20 lies in a pick-up position in order to individualize an information carrier 2 from a magazine with a supply 200 of information carriers and attach it to the manipulator using suction cup 22 for release thereof from the magazine. The manipulator is extended here over a full stroke IV about its pivot shaft 24, and drive rod 21 with suction cup 22 also protrudes over a full stroke III from the manipulator in order to reach the information carrier. In the situation shown in FIG. 1B drive rod 21 is retracted and information carrier 2 is clear of the magazine. Manipulator 20 is then extended in line with support arm 31, see FIG. 1C, and with a controlled stroke VII positions information carrier 2 with a strip-like part partially in front of anvil 32, FIGS. 1C and 2A, or almost or wholly against it, see FIGS. 1D and 2B. This stroke VII can be adjusted or programmed to finally position the information carrier outside or inside container 1 as desired. It is thus possible to make allowance for a beaded edge 11 which may be present on an upper side of container 1 and which could otherwise possibly disrupt a satisfactory attachment of the information carrier to the container wall.

Support arm 31, driven here by its actuator 35, then makes a downward stroke II whereby the information carrier is carried inside the container together with anvil 32, see FIG. 2C. On its free side remote from arm 31 the anvil 32 has a slightly convex surface and takes a relatively solid form to be able to easily penetrate a growth substrate of the plant received in the container. Information carrier 2 is co-displaced here and thus inserted between the substrate and the wall of the container without deforming at all. For the purpose of precise fixing of the container during this and a subsequent step, fixation means are provided in the form of an intermittently protruding member 50 which now protrudes into the transport path of container 1 in order to temporarily halt the container.

As final step, sonotrode 41 is now extended and brought into contact with the outer wall of container 1 so as to finally firmly enclose the wall and information carrier 2 together with anvil 32, see FIG. 2D. Sonotrode 41 is activated in this active position of the welding device, whereby a reliable connection is realized between information carrier 2 and an inner side of container 1. Finally, sonotrode 41 is once again retracted and the support arm returned to its starting position as shown in FIG. 1A; ready for a subsequent container 1 and information carrier 2. Protruding member 50 now returns to its starting position outside the transport path of containers 1 in order to release the container just treated and admit a subsequent container.

Although the invention has been further elucidated with reference to only the foregoing embodiment, it will be apparent that the invention is by no means limited thereto. On the contrary, many other variations and embodiments are possible within the scope of the invention for the person with ordinary skill in the art. Use is thus advantageously made in the given embodiment of a second transport means and an ultrasonic welding torch which are both mounted on the support arm, although one of the two can if desired also be provided separately of the support arm. The magazine from which a second product is taken can on the other hand optionally also be arranged on the support arm together with at least the manipulator, particularly between the pivot shaft of the support arm and the actuator of the manipulator, in order to thus always be within reach of the manipulator.

Use is also made in the shown embodiment of a container or flowerpot for a pot plant or the like as first product, to which a substantially card or strip-like information carrier had to be connected as second product. The device can however be utilized more widely, both within the field of processing pot plants, for instance to connect a handle on either side to opposite sides of the container, and outside this field. The second supply means can particularly also be provided on the underside, more particularly on the underside of the support arm, in order to present second products from below. In the described processing of pot plants this avoids contact with the plant to significant extent, and so the chance of damage thereto, while the information carrier can be attached to an outer wall of the container.

The invention generally always provides an exceptionally compact, reliable and operationally reliable solution for a desired mutual attachment of products.

The invention claimed is:

1. Device for attaching a first product to a second product, comprising an ultrasonic welding device which is intended and adapted to realize a durable welded connection between a wall of the first product and the second product, which welding device comprises an ultrasonic welding torch and an anvil which are each displaceable between a rest position, clear of the first product and the second product, and an active position opposite each other in which a wall part of the first product and a strip-like part of the second product lie therebetween, first supply means suitable and intended for receiving the first product thereon and supplying it in a transport direction to the welding device, and second supply means suitable and intended for receiving the second product and moving at least the strip-like part thereof close to the wall of the first product, wherein the welding device comprises a displaceable support arm and the anvil extends from the displaceable support arm with which the anvil is displaceable between the rest position and the active position, characterized in that at least one of the welding torch and the second supply means extends together with the anvil from the displaceable support arm and is displaceable at least particularly with the support arm between at least the rest position and the active position.

2. Device as claimed in claim 1, characterized in that the support arm is pivotable about a rotation shaft directed at least substantially parallel to the transport direction, and that the support arm is coupled to an actuator, particularly a linear actuator, which is able and adapted to impose on the support arm a controlled rotation about the pivot shaft between the rest position and the active position.

3. Device as claimed in claim 1, characterized in that at least the second supply means extend from the displaceable support arm and are thereby displaceable between a pick-up position for receiving the second product and the active position for presenting therein the second product with the strip-like part between the welding torch and the anvil.

4. Device as claimed in claim 3, characterized in that the pick-up position coincides with the rest position of the anvil.

5. Device as claimed in claim 1, characterized in that the second supply means comprise a manipulator with a pick-up member which is able and adapted to enter into a temporary attachment with the second product and that the pick-up member is displaceable from the manipulator between the pick-up position, in which the second product is picked up, and at least one further position, particularly an adjustable further position, in which the second product is presented between the welding torch and the anvil.

6. Device as claimed in claim 5, characterized in that the manipulator is connected to the support arm for pivoting about a rotation shaft directed transversely of a rotation shaft of the support arm.

7. Device as claimed in claim 1, characterized in that at least the welding torch is connected to the support arm and extends from the support arm at an outer end thereof.

8. Device as claimed in claim 7, characterized in that at least one of the anvil and the welding torch is displaceable to the other of the anvil and the welding torch in order to enclose the wall of the first product and the strip-like part of the second product therebetween.

9. Device as claimed in claim 8, characterized in that the welding torch is linearly displaceable in a path directed substantially parallel to the support arm toward the anvil.

10. Device as claimed in claim 1, characterized in that a magazine is provided which is intended and adapted to receive a supply of second products therein and to successively present a subsequent second product to the second supply means for pick-up purposes.

11. Device as claimed in claim 10, characterized in that the magazine is connected to the support arm.

12. Device as claimed in claim 1, characterized in that the anvil is mounted on an outer end of the support arm and has on a side remote from the welding torch a substantially convex surface at least in a direction of displacement thereof.

13. Device as claimed in claim 1, characterized in that the first supply means comprise a driven endless conveyor belt.

14. Device as claimed in claim 13, characterized in that the conveyor belt is provided at the position of the welding device with fixation means for receiving a first product supplied thereby and temporarily fixing it relative to the welding device.

15. Device as claimed in claim 14, characterized in that the fixation means comprise an intermittently protruding member which is displaceable in a linear path directed transversely of the transport direction between a rest position located outside a transport path of a first product and a fixation position located in the transport path.

16. Ultrasonic welding device of the type as applied in the device as claimed in claim 1, comprising a displaceable support arm, from which an anvil and at least one of an ultrasonic welding torch and supply means for a second product extend so as to be displaceable together with the anvil between at least an active position and a further position thereof.

17. Device as claimed in claim 2, characterized in that at least the second supply means extend from the displaceable support arm and are thereby displaceable between a pick-up position for receiving the second product and the active position for presenting therein the second product with the strip-like part between the welding torch and the anvil.

* * * * *